(12) United States Patent
Cohen et al.

(10) Patent No.: US 12,184,798 B2
(45) Date of Patent: Dec. 31, 2024

(54) DYNAMIC VALUE APPENDED TO COOKIE DATA FOR FRAUD DETECTION AND STEP-UP AUTHENTICATION

(71) Applicant: PAYPAL, INC., San Jose, CA (US)

(72) Inventors: Adam Cohen, Ramat Gan (IL); Yuval Bercovich, Yavne (IL)

(73) Assignee: PAYPAL, INC., San Jose, CA (US)

( * ) Notice: Subject to any disclaimer, the term of this patent is extended or adjusted under 35 U.S.C. 154(b) by 760 days.

(21) Appl. No.: 17/364,736

(22) Filed: Jun. 30, 2021

(65) Prior Publication Data

US 2023/0006844 A1  Jan. 5, 2023

(51) Int. Cl.
*H04L 9/32* (2006.01)
*G06Q 20/40* (2012.01)
*H04L 9/06* (2006.01)

(52) U.S. Cl.
CPC ....... *H04L 9/3297* (2013.01); *G06Q 20/4014* (2013.01); *G06Q 20/4016* (2013.01); *H04L 9/0618* (2013.01); *H04L 9/3226* (2013.01)

(58) Field of Classification Search
None
See application file for complete search history.

(56) References Cited

U.S. PATENT DOCUMENTS

| | | | |
|---|---|---|---|
| 10,356,053 B1* | 7/2019 | Zubovsky | H04L 63/0428 |
| 11,233,802 B1* | 1/2022 | Rudeanu | H04L 63/0435 |
| 2010/0017596 A1* | 1/2010 | Schertzinger | H04L 63/062 |
| | | | 713/155 |
| 2010/0306547 A1* | 12/2010 | Fallows | H04L 63/0815 |
| | | | 713/178 |
| 2015/0052584 A1* | 2/2015 | Rudraraju | H04L 63/102 |
| | | | 726/4 |
| 2016/0173617 A1* | 6/2016 | Allinson | H04L 67/148 |
| | | | 709/227 |

(Continued)

OTHER PUBLICATIONS

H. Wu, W. Chen and Z. Ren, "Securing Cookies with a MAC Address Encrypted Key Ring," 2010 Second International Conference on Networks Security, Wireless Communications and Trusted Computing, Wuhan, China, 2010, pp. 62-65, (Year: 2010).*

(Continued)

*Primary Examiner* — Luu T Pham
*Assistant Examiner* — Edward X Long
(74) *Attorney, Agent, or Firm* — Haynes and Boone, LLP

(57) ABSTRACT

There are provided systems and methods for a dynamic value appended to cookie data for fraud detection and step-up authentication. A service provider, such as an electronic transaction processor for digital transactions, may utilize computer cookies for authentication and/or login for a user account. In order to further secure cookies from being compromised and used by malicious parties for fraudulent account access, the service provider may add or append a dynamic value that changes at each subsequent login to the computer cookie. The dynamic value may be used so that if a computer cookie is misappropriated, only one device may use the cookie once without the cookie updating and invalidating the cookie with another device or application on the device. Thereafter, when a login is requested, the dynamic value is matched to an expected value by the service provider when determining whether to authenticate the device.

20 Claims, 6 Drawing Sheets

(56) References Cited

U.S. PATENT DOCUMENTS

| | | | |
|---|---|---|---|
| 2017/0374198 A1* | 12/2017 | de Silva | H04M 3/5191 |
| 2021/0360025 A1* | 11/2021 | O'Hara | H04L 63/0892 |
| 2022/0060446 A1* | 2/2022 | Dalvi | H04L 63/0236 |
| 2022/0255745 A1* | 8/2022 | Tiffany | G06F 21/31 |

OTHER PUBLICATIONS

Dacosta, I., Chakradeo, S., Ahamad, M. and Traynor, P., 2012. One-time cookies: Preventing session hijacking attacks with stateless authentication tokens. ACM Transactions on Internet Technology (TOIT), 12(1), pp. 1-24. (Year: 2012).*

Sood, S.K., Sarje, A.K. and Singh, K., 2011. Inverse Cookie-based Virtual Password Authentication Protocol. Int. J. Netw. Secur., 13(2), pp. 98-108. (Year: 2011).*

* cited by examiner

DYNAMIC VALUE APPENDED TO COOKIE DATA FOR FRAUD DETECTION AND STEP-UP AUTHENTICATION

TECHNICAL FIELD

The present application generally relates to computer cookies having dynamic and static portions for authenticating and account login and more particularly to adding or appending a dynamic value to a computer cookie that updates during subsequent login for fraud detection.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. During use of these computing services, processing platforms, and services, the service provider may utilize computer cookies, which correspond to data strings, tokenized data, identifiers, or the like, that are locally stored on a computing device when a login or authentication is successful. The computer cookie may then be provided back to the service provider in a subsequent login as an additional piece of trusted data to authenticate the user and/or trust that the computing device and/or application requesting a login and authentication is not fraudulent. However, malicious parties and fraudsters may obtain computer cookies, which may then be used to compromise an account and/or obtain fraudulent authentication. Thus, computer cookies that contain static data may be used fraudulently or not provide adequate security for authentication.

Figure 1:
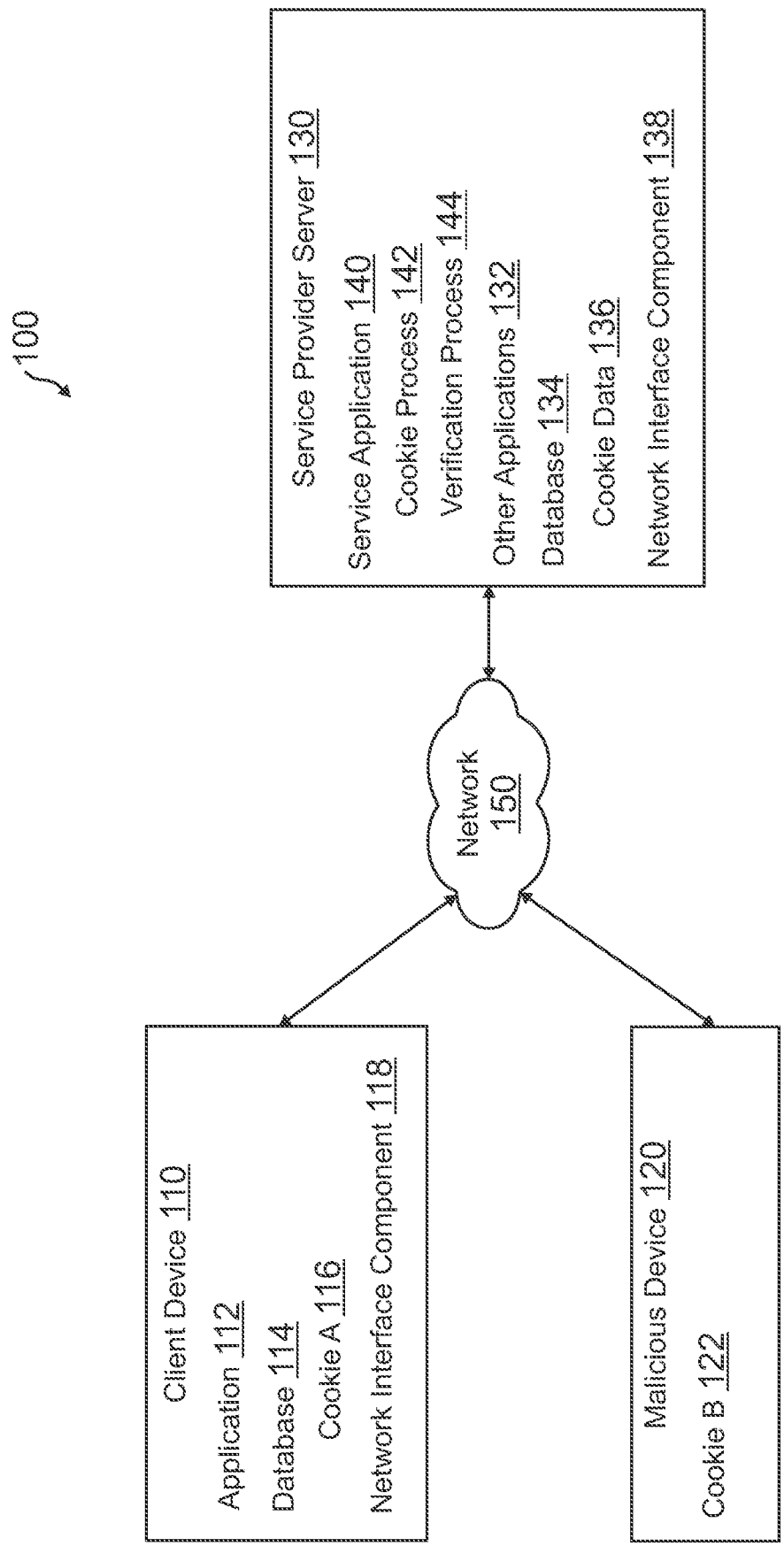
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a dynamic value appended to cookie data for fraud detection and step-up authentication. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may utilize computer cookies and other device identifiers or fingerprints in order to reduce risk, fraud, and other misappropriation of data during login and/or authentication. For example, an online transaction processor may provide electronic transaction processing services, including account services, user authentication and verification, digital payments, risk analysis and compliance, and the like. A computing device of a user may be a key element to enabling authentication and/or access to an account. For example, after a user has used a particular device to authenticate and/or login to an account, a computer cookie may be stored locally to the device and/or associated with the device and application used for the authentication. This computer cookie may correspond to a data string, identifier, device fingerprint (e.g., based on device identifiers, operating system data or identifiers, applications, and the like), or other data that uniquely identifies the user's device. This may allow for more trusted authentication and/or login. However, the computer cookie or other identifier may include a static portion or identifier, as well as a dynamic portion, value, or identifier. The dynamic value may be updated during subsequent logins and when received by the service provider during authentication. Thus, if the cookie is compromised, maliciously obtained, and/or used in a subsequent authentication that is not approved, the dynamic value may be matched to an expected dynamic value. If the values do not match, the current login and/or a previous login using the received cookie and dynamic value may be flagged as potentially fraudulent. Thus, a step-up authentication may be required.

For example, a service provider, such as an online transaction processor (e.g., PayPal®), may provide services to users, including electronic transaction processing that allows merchants, users, and other entities to process transactions, provide payments, and/or transfer funds between these users. When interacting with the service provider, the user may process a particular transaction to provide a payment to another user or a third-party for items or services. Moreover, the user may view one or more digital accounts and/or digital wallets, including a transaction history and other payment information associated with the user's payment instruments and/or digital wallet that stores and/or generates digital tokens. The user may also interact with the service provider to establish an account and other information for the user. In further embodiments, other service providers may also provide computing services, including social networking, microblogging, media sharing, messaging, business and consumer platforms, etc. These computing services may utilize and/or require computer cookies or other device identifiers having dynamic values appended or added as discussed herein.

In order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of aforementioned data and/or digital wallet data for transaction processing. Thus, a transaction processor, such as PayPal® or other online payment providers, may provide authentication and account login services.

A user or other entity may initiate electronic transaction processing for a transaction (or perform another secure interaction, such as account or user verification, authentication, and the like) through a resident computing application or website of a transaction processor. The transaction processor may include operations for authentication and/or login to the user's account. For example, one or more interfaces, data fields, and/or operations may be provided for a user to enter account credentials, such as a username, password, PIN, multifactor authentication secret, and the like. Once the user is authenticated, the service provider may create or retrieve a device identifier or other data used for a computer cookie that is stored on the device that performs the authentication. This computer cookie acts as an additional piece of data for risk analysis during authentication, such as by further verifying that the device performing the authentication has been used by the user in the past and/or is trusted.

However, when a computer cookie used for authentication, login, and/or other secure processes is generated and stored on the user's computing device, the service provider may also append or add an additional layer of data to the cookie. The additional layer of data may correspond to the dynamic value, portion, or identifier that is added to the static portion or identifier of the computer cookie. For example, when a user initially authenticates and/or logs in to an account, a computer cookie or other device identifier may be created for the computing device performing the authentication (e.g., a personal computer, tablet computer, mobile smart phone, etc.). The computer cookie includes a "static" cookie that corresponds to a portion, identifier, or value for the cookie. The service provider may further generate and/or append to this static identifier a dynamic device identifier, portion, or value. In some embodiments, the user's device may generate the dynamic value or code or may negotiate the dynamic value with the service provider. The dynamic value may be generated for the particular session, which may also correspond to a session identifier or the like. The dynamic value is then stored with or in association with the static cookie on both the user's device and the service provider's server or database system.

The dynamic value is then later provided with the static identifier for the computer cookie when performing a subsequent authentication or login. If the service provider receives the dynamic value for the cookie and is able to match that dynamic value to the expected dynamic value stored by the service provider, the service provider may authenticate the user and/or have more reliance in the authentication (e.g., lower risk). Thus, the service provider may provide automatic authentication and/or may not require increased authentication (e.g., a step-up in authentication). This may also allow the device requesting the authentication to access additional data, features, and/or processes, as well as trust the device further during use of those processes (e.g., allow changing and/or viewing of personal or financial data, increasing transaction processing limits, and the like). After use of the dynamic value during the authentication, the dynamic value may be updated, changed, or increased, such as an incremental increase for successive logins. When the dynamic value is updated, the used dynamic value may be expired or made invalid for subsequent logins. Thus, after use, the dynamic value no longer is used for the computer cookie and its use may be identified as fraudulent or suspicious.

However, computer cookies and identifiers may be compromised by malicious parties, such as if a device is compromised by a fraudulent actor, malware, virus, or the like. This may allow other parties to obtain computer cookies and attempt to utilize data from the cookie for a fraudulent login. Thus, if the service provider receives the computer cookie with the dynamic value, and the dynamic value does not match the expected and/or stored dynamic value for the computer cookie, the service provider may flag the authentication and/or login as suspicious or fraudulent. If no dynamic value is attached, appended, or received with the computer cookie, and a dynamic value is expected for that computer cookie, then it may be determined that the computer cookie was stolen prior to adding dynamic values to computer cookies. In this regard, the service provider may refuse automatic authentication and/or may require a step-up in authentication (e.g., multifactor authentication, provision of additional data known for the user but sensitive or secure, etc.). If the device using the dynamic portion for the computer cookie is unable to further authenticate during the step-up, the service provider may flag the computer cookie as compromised and/or may alert the user or an administrator of the attempted suspicious authentication. Further, the service provider may then issue a new cookie (including both static and dynamic identifiers or values) to the user's device once the user's is able to re-authenticate and the service provider trusts the further login. The service provider may also or instead revoke any trust provided from the static portion or identifier of the cookie.

The service provider may maintain a log or other digital ledger of the usage of different dynamic values for the computer cookie and their corresponding authentications. In this regard, if the dynamic value is received and not matched to an expected dynamic value, and the device passes a step-up authentication and is authenticated, the service provider may review a previous use of the computer cookie having the received dynamic value and/or authentications between use of the dynamic value for an authentication and a current time or authentication that uses the received dynamic value. These logins may be examined for fraud and/or misuse, including electronic transaction processing or other computing events that may have occurred during the authentications. Further, information from computing logs and the like may be analyzed for these logins, such as to determine device identifiers, IP addresses, and the like to identify fraudsters.

Further, if the dynamic value has been previously flagged as compromised or used, during the authentication using the flagged dynamic value, one or more honeypot interfaces, webpages, and/or operations may be used to attempt to determine more information about the potential fraudster and/or device. This may include utilizing fake or honeypot forms to get information about an electronic transaction processing request (e.g., a destination bank account or user), but not executing the processing request to avoid fraud. Further, a better service may be provided to users that are victims of malware, cookie misappropriation, and the like. For example, it may be difficult to distinguish between a victim and an abuser or malicious actor that misappropriated a computer cookie. However, using the processes herein, the victim may be better identified and improved services and/or customer experience for resolving unauthorized account usage (e.g., unauthorized payments or transactions) based on identifying the victim after a step-up authentication and/or valid computer cookie with dynamic value. This allows the service provider to identify the user was compromised and assist the user in a customer experience, such as by handling claims faster or in different communication channels that may provide improved services. Additional remedial actions may be taken, such as by utilizing a different device to request further authentication and/or provide a secret for a multifactor authentication process. The service provider may also remediate or reverse any operations performed using the account, such as by reversing any data processing requests, data entry or use, and the like that may have been performed during the suspicious authentications. When doing so, the aforementioned improved services and customer experiences may be provided when the user is identified as compromised. In some embodiments, the experience may be proactively provided prior to a user logging in, such as when a user is alerted of a potential fraudulent usage of an account based on a stale dynamic value for a computer cookie.

The dynamic value may correspond to an alphanumeric portion, identifier, and/or value. The dynamic value may therefore correspond to a unique code that may be a layer of a computer cookie generated during the authentication and/or login session. In certain embodiments, the dynamic portion may be sequentially updated and renewed during further logins. The dynamic value may also or instead correspond to a timestamp, which may be timestamped down to a millisecond for accuracy and difficulty in imitation. The dynamic value may also correspond to randomized, digitally signed, and/or encrypted data. In this regard, the service provider may detect retransmission of data in order to determine suspicious activity and/or fraud. Thus, other sequences or data may also be used, and dynamic values may also correspond to identifiers, tokens, data strings, or other portions of data that may be combined with a static identifier for a cookie. Accordingly, the service provider may utilize any combination of numbers, letters, symbols, or other characters that may be used for unique identifying a device and/or cookie in a dynamic manner when attached or appended to a static identifier that is stored on the device and the service provider's system.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a malicious device 120, and a service provider server 130 in communication over a network 150. Client device 110 may be utilized by a user to access a computing service or resource provided by service provider server 130, where service provider server 130 may provide various data, operations, and other functions to client device 110 via network 150. This may include account, authentication, and/or electronic transaction processing services or other services that require use of computer cookies or other device identifiers to provide further security during login and/or authentication. In this regard, client device 110 may be used to request authentication, for example, in order to process a transaction or perform other computing operations and services. Service provider server 130 may provide a computer cookie having a dynamic portion or value in addition to a static identifier.

Client device 110, malicious device 120, and/or service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 130. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 114, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute modules and associated components of client device 110 to interact with a service provider or other online entity that may provide account services, resources, and services that may include use of cookie data and computer cookies, such as for authentication and/or account login with service provider server 130. In this regard, application 112 may correspond to specialized hardware and/or software utilized by client device 110 to establish an account and utilize the account, which may include generating account, user, device, transaction, and financial data associated with the account. Application 112 may be used to register and access an account, such as by providing user personal and/or financial information, setting authentication information, queries, and challenges, and maintaining the account by providing other necessary information for account usage and/or verification. In this regard, with a transaction processor system, application 112 may be used, during electronic transaction processing, to utilize user financial information, such as credit card data, bank account data, or other funding source data, as a payment instrument associated with the account for electronic transaction processing of a transaction.

For example, application 112 may utilize a digital wallet associated with the account as the payment instrument, for example, through accessing a digital wallet or account of a user through entry of authentication credentials and/or by providing a data token that allows for processing using the account. Further, application 112 may be used to provide a cookie A 116 from database 114 during authentication and/or login, which may correspond to a digital computer cookie that includes a static cookie identifier and a dynamic value, identifier, or portion that can be updated and changed for each subsequent login attempt using the computer cookie. Application 112 may generate the dynamic value or may receive the dynamic value from service provider server 130 during the initial login to establish the computer cookie, as well as the subsequent logins. Application 112 may also be used to perform electronic transaction processing. However, in other embodiments, application 112 and the account may be used for other types of services that use tokenized data in one or more processes, such as messaging, email, social networking or media, media sharing, microblogging, and/or other online activities.

Application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website. However, in other embodiments, application 112 may include a dedicated application of service provider server 130 or other entity (e.g., payment provider, merchant, etc.), which may be configured to provide services through the application. Application 112 may therefore be used to utilize account and service provider services provided by service provider server 130, including those associated with electronic transaction processing through an account. In this regard, while utilizing the services and data processing features of service provider server 130, application 112 may provide cookie A 116 during an authentication and/or login to the account, which may allow passwordless authentication, more trusted authentication, and/or does not require step-up or multifactor authentication. These may include authenticating using cookie A 116 and/or additional authentication information, which may be analyzed for comparison to an expected dynamic value for cookie A 116 and used with risk analysis and/or fraud detection systems, such as electronic transaction processing systems.

Client device 110 may further include database 114 stored on a transitory and/or non-transitory memory of client device 110, which may store various applications and data and be utilized during execution of various modules of client device 110. Database 114 may include, for example, identifiers such as operating system registry entries, cookies associated with application 112 including cookie A 116 having a dynamic value in addition to a static identifier, identifiers associated with hardware of client device 110, or other appropriate identifiers, such as identifiers used for payment/user/device authentication or identification, which may be communicated as identifying the user/client device 110 to service provider server 130.

Client device 110 includes at least one network interface component 118 adapted to communicate with malicious device 120 and/or service provider server 130 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Malicious device 120 may be implemented as a communication device that may utilize appropriate hardware and software configured for wired and/or wireless communication with client device 110 and/or service provider server 130. For example, in one embodiment, malicious device 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of malicious devices may similarly operate to abuse a computer cookie that is compromised, such as a cookie B 122.

In this regard, malicious device 120 may be used by a malicious or fraudulent user that has compromised a computer cookie that has been issued to client device 110, cookie B 122. For example, malicious device 120 may compromise client device 110, maliciously obtaining cookie B 122, such as through a computing attack, fraudulent action, malware, or the like. Cookie B 122 may have a same static portion or identifier as cookie A 116 stored on client device 110. However, a dynamic value for cookie B 122 may be different from cookie A 116, and thus, either the dynamic value of cookie A 116 or the dynamic value of cookie B 122 may not be the expected identifier, portion, or value when received by service provider server 130. As such, a future login using one of cookie A 116 or cookie B 122 may be flagged as suspicious or fraudulent, and a step-up authentication may be required. Where cookie A 116 includes the most recent dynamic value, then malicious device 120 may be flagged as potentially abusive, malicious, or fraudulent when cookie B 122 is used, and authentication step-up may be required or malicious device may be probed for additional information. However, where cookie B 122 may have the most recent dynamic value (e.g., is compromised, used for a login, and updated on malicious device 120 without updating cookie A 116 on client device 110), then when cookie A 116 is provided and step-up authentication is successfully completed, malicious device 120 and/or cookie B 122 may be flagged for review and determination of any malicious or fraudulent logins, authentications, or executed computing operations.

Service provider server 130 may be maintained, for example, by an online service provider, which may provide services that use cookie data during one or more processing interactions, including login and/or authentication. In this regard, service provider server 130 includes one or more processing applications which may be configured to interact with client device 110 to provide computing services including electronic transaction processing to users. In one example, service provider server 130 may be provided by PAYPAL®, Inc. of San Jose, CA, USA. However, in other embodiments, service provider server 130 may be maintained by or include another type of service provider including token service providers and the like.

Service provider server 130 of FIG. 1 includes a service application 140, other applications 132, a database 134, and a network interface component 138. Service application 140 and other applications 132 may correspond to executable processes, procedures, and/or applications with associated hardware. In other embodiments, service provider server 130 may include additional or different modules having specialized hardware and/or software as required.

Service application 140 may correspond to one or more processes to execute modules and associated specialized hardware of service provider server 130 to process a transaction or provide another service to internal and/or external end users of service provider server 130. In some embodiments, service application 140 may correspond to specialized hardware and/or software used by a user associated with client device 110 to establish an account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. The payment account may be accessed and/or used through a browser application and/or dedicated payment application executed by client device 110 and engage in transaction processing through service application 140. Service application 140 may process the payment and may provide a transaction history to client device 110 for transaction authorization, approval, or denial. However, in other embodiments, service application 140 may instead provide different computing services, including social networking, microblogging, media sharing, messaging, business and consumer platforms, etc.

In this regard, service application 140 may further include authentication and/or account login processes, which may be facilitated using authentication information and a computer cookie or other device identifier locally stored on the device requesting authentication. For example, when authenticating and/or requesting lowered authentication (e.g., passwordless authentication), client device 110 may initially provide authentication information, which may cause cookie process 142 to initially generate a computer cookie having a static identifier and dynamic value or portion. Cookie process 142 may request the cookie data from client device 110, may generate the cookie data and cause to be stored on client device 110, and/or may generate with client device 110, such as through negotiated or exchanged data. The static identifier may be unique to client device 110, but may be misappropriated and used to fraudulently imitate client device 110.

As such, cookie process 142 may further generate a dynamic portion or value for the computer cookie that is particular to a certain authentication and/or login session, and is further required to be provided in a next subsequent authentication or login and matched to a stored expected dynamic value by verification process 144. For example, where cookie A 116 corresponds to the most recent login and has a dynamic value that is expected from cookie data 136 stored on database 134, cookie A 116 may then correspond to the computer cookie that is required to be provided in the subsequent login and checked for the expected value by verification process 144. Thus, if cookie B 122 misappropriated by the malicious party using malicious device 120 is instead provided, the login may be flagged as suspicious and/or fraudulent, and remediation steps may be taken and/or authentication required to be stepped up (e.g., additional authentication information may be required).

However, if cookie B 122 is the expected value based on misappropriation and use of a valid cookie having an expected dynamic portion, then when cookie A 116 is provided, step up authentication and/or notification may be provided on client device 110 by verification process 144. Thus, when the valid user for the account further authenticates and is trusted, any use of the cookies and/or authentications between when cookie A 116 was issued (e.g., based on a timestamp and/or logs of cookie uses) and a current time period may be flagged for review and/or suspicious behavior. Further, cookie B 122 and/or other cookies may be flagged as suspicious if further used. Since cookies may not be shared between computing devices and/or applications, the dynamic portion that is expected provides increased trust and lower risk during authentication. Thus, authentication requirements may be lowered (e.g., passwordless authentication) and the login may be trusted.

In various embodiments, service provider server 130 includes other applications 132 as may be desired in particular embodiments to provide features to service provider server 130. For example, other applications 132 may include security applications for implementing server-side security features, programmatic client applications for interfacing with appropriate application programming interfaces (APIs) over network 150, or other types of applications. Other applications 132 may contain software programs, executable by a processor, including one or more GUIs and the like, configured to provide an interface to the user when accessing service provider server 130, where the user or other users may interact with the GUI to more easily view and communicate information. In various embodiments, other applications 132 may include additional connection and/or communication applications, which may be utilized to communicate information to over network 150.

Additionally, service provider server 130 includes database 134. Database 134 may store various identifiers associated with client device 110. Database 134 may also store account data, including payment instruments and authentication credentials, as well as transaction processing histories and data for processed transactions. Database 134 may store financial information and authentication data including cookie data 136 for one or more cookies having a static identifier with a dynamic value that is updated and/or replaced during subsequent logins. Cookie data 136 may therefore include static identifiers for computer cookies and other static device identifiers, as well as dynamic portions that are updated using cookie process 142 and/or verified using verification process 144.

In various embodiments, service provider server 130 includes at least one network interface component 138 adapted to communicate client device 110 and/or malicious device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
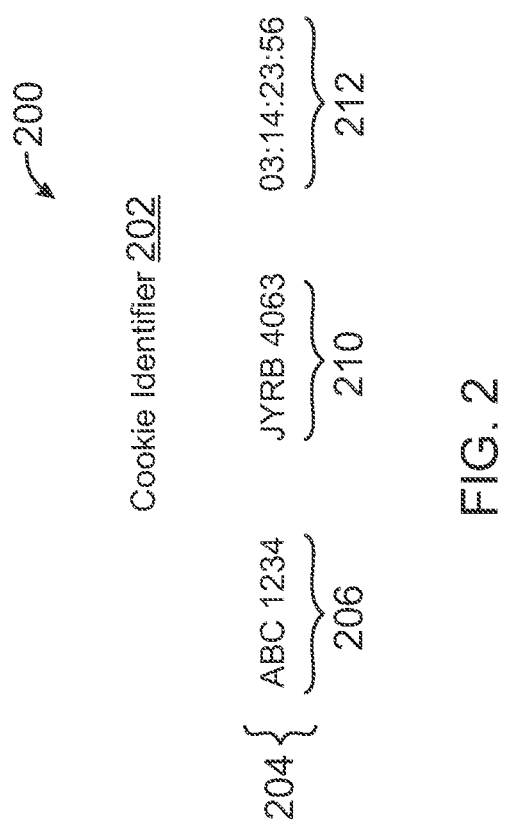
FIG. 2 is an exemplary diagram of a computer cookie that includes a dynamic portion for fraud detection during subsequent logins, according to an embodiment.

FIG. 2 is an exemplary diagram 200 of a computer cookie that includes a dynamic portion for fraud detection during subsequent logins, according to an embodiment. Diagram 200 includes a cookie identifier 202 generated during a login by client device 110 with service provider server 130 discussed in reference to system 100 of FIG. 1. In this regard, cookie identifier 202 may be compromised, stolen, or otherwise maliciously obtained or copied by malicious device 120 discussed in reference to system 100.

In diagram 200, cookie identifier 202 is shown that requires numbers, characters, symbols, timestamps, or the like that may be added to a computer cookie that is generated from a login or authentication, such as between client device 110 and service provider server 130. Cookie identifier 202 includes cookie data 204, which may include individual identifiers, portions, or values added for a static identifier 206, a dynamic value 210, and/or, optionally, a timestamp 212. Although cookie identifier 202 is shown with all the different portions in cookie data 204, it is understood that one or more of the portions may not be present, may be combined, or may be switched out for other portions and necessary and/or established for the corresponding cookie generation schema. Additionally, in some embodiments, cookie identifier 202, static identifier 206, dynamic value 210, and/or timestamp 212 may be encrypted or hashed prior to storage by the computing device and/or service provider's server.

Static identifier 206 may correspond to a static cookie identifier for a corresponding device. Static identifier 206 may be generated by a computing device performing the authentication and/or login, a service provider that facilitates the authentication and/or login based on received authentication information (e.g., username, password, multifactor authentication data, or the like). For example, a static identifier 206 may be provided by the computing device performing the authentication and/or login, such as based on device-specific data. Static identifier 206 may therefore correspond to a device identifier, device fingerprint, or the like. Static identifier 206 may then be provided by the service provider's server facilitating the authentication and/or login, such as based on an account identifier, initial session identifier, or user data (e.g., personally identifiable information (PII) or other personal information, account name or information, and the like).

Once received, static identifier 206 may correspond to the static portion for cookie identifier 202 that does not change between successive logins. However, static identifier 206 may be updated after a certain number of uses, detection of suspicious activity and/or compromising of cookie identifier 202, or other security and risk analysis. Further, by having a server of the service provider (e.g., service provider server 130), static identifier 206 may not be needed for cookie identifier 202. For example, a static identifier may be entirely inferred by the server and a corresponding database (e.g., database 134 for service provider server 130). Thus, only dynamic value 210 may be used for certain computing devices and static identifier 206 may be inferred from receiving dynamic value 210 from a device, where dynamic value 210 may be identifiable and used for login by the server using its database. Optionally, device data or a device fingerprint, a browser or application identifier, a login name, and account identifier, or the like may also be used to infer or add a static identifier.

Cookie identifier 202 further includes dynamic value 210 and, optionally, timestamp 212 that may correspond to dynamic portions, identifiers, or values that are used for single use authentication and/or login and are changed at each subsequent login. For example, dynamic value 210 and timestamp 212 may be established for a particular login session and, at a next subsequent login, may be compared to the expected value from that previous login session to determine if cookie identifier 202 has been compromised or does not meet the expected value. If the expected values for dynamic value 210 and timestamp 212 are matched, cookie identifier 202 may not be compromised (or may be used by a malicious party that is later detected when cookie identifier 202 is reused by an authorized user). Thus, dynamic value 210 may include randomized data or values, or a sequentially increasing value may be used. Timestamp 212 may correspond to a timestamp, which may be down to a millisecond, that is further associated with the authentication and/or login. Once dynamic value 210 and timestamp 212 are set, cookie identifier 202 is then stored to local storage on the computing device performing the authentication. Further, the service provider's server may request at least dynamic value 210 and timestamp 212 are stored for the user's account and/or static identifier 206, which may be used for the subsequent comparison and authentication.

In some embodiments, cookie identifier 202 may be stored locally by a browser application when a website is accessed and an authentication or other process is performed, which may utilize cookie identifier 202 for later reauthentication or data retrieval. The browser application may store locally to a cache or other semi-permanent storage or may persist to more permanent storage. Browsers may also include a "browser local storage," which may correspond to a property or feature that allows for storage with or in a web browser. This may be stored in a file for the web browser or other storage mechanism. Using this mechanism, cookie identifier 202 and/or a similar dynamic value to dynamic value 210 may be stored for the web browser. In some embodiments, the dynamic value may also be stored with a static identifier similar to static identifier 206. This may allow for usage of the dynamic value later during login attempts and authentication. However, if misappropriated and used by another browser through its corresponding local storage, similar operations to those discussed herein may be performed for matching and validating of the dynamic value. In additional, the computer cookies discussed herein and the dynamic values with a browser local storage may be used in conjunction in order to provide for additional protections. Thus, multiple dynamic values may be compared between different stored values, storage means, and the like.

In some embodiments, mobile applications or other resident software applications may also utilize static and dynamic identifiers in order to secure authentication. For example, a mobile application on a mobile phone may utilize an identifier similar to cookie identifier 202 in order to perform authentication and further secure authentication attempts using a dynamic value. In this regard, the mobile application or other software application may store a static identifier similar to static identifier 206 and a dynamic value similar to dynamic value 210 when an authentication is performed. These may later be provided with further authentication attempts, which enables a process described herein to confirm if the dynamic value is expected for the static identifier.

By comparing and matching dynamic value 210 and timestamp 212 from cookie identifier 202 to expected and stored values for dynamic value 210 and timestamp 212 from the service provider's systems, authentication may be reduced and/or device trust may be increased. However, in other embodiments, just one of dynamic value 210 or timestamp 212 may be used as the dynamic portion, identifier, or value that is added to cookie identifier 202, or dynamic value 210 and timestamp 212 may be combined into a single dynamic value (including, for example, generating a hash through a hashing algorithm of the dynamic value). Further, during a first session of use of cookie identifier 202, NULL may be provided by the computing device and/or set by the server for dynamic value 210.

Figure 3:
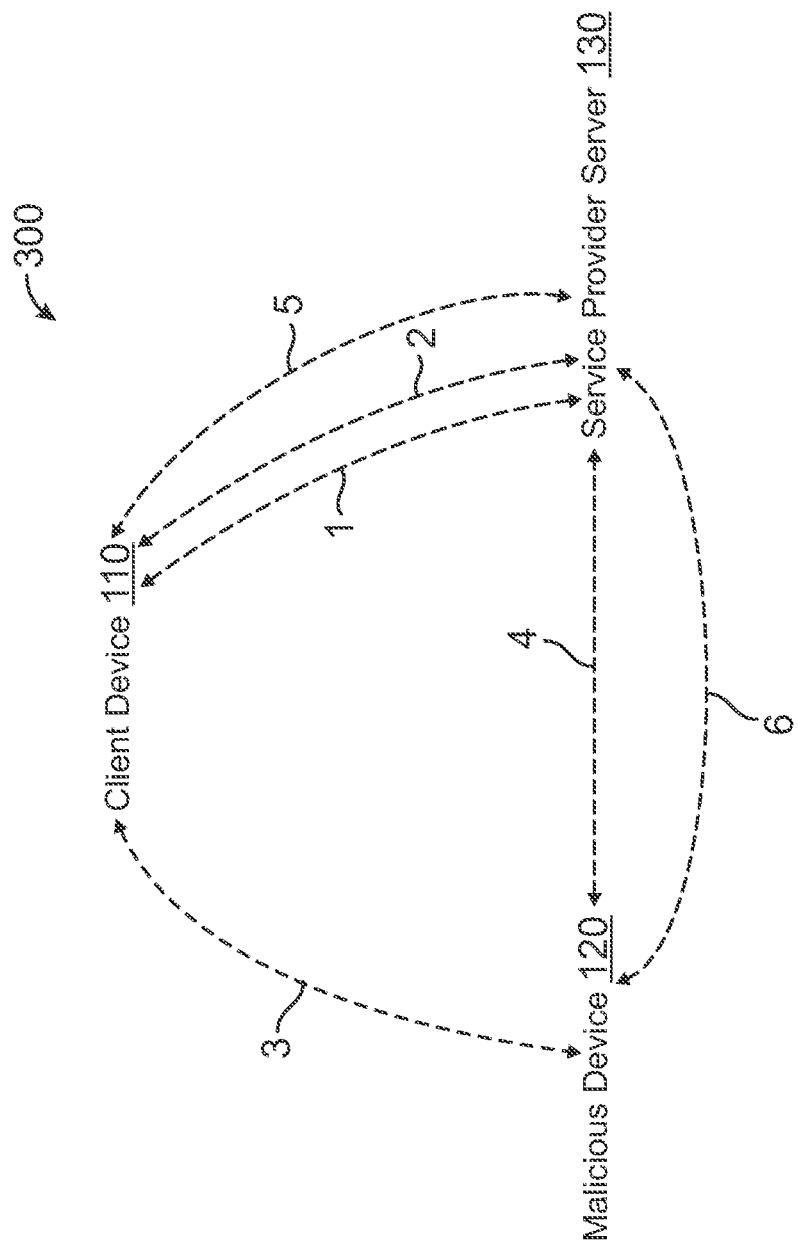
FIG. 3 is an exemplary system environment for generating and utilizing a computer cookie having a dynamic portion updated during successive logins and use, according to an embodiment.

FIG. 3 is an exemplary system environment 300 for generating and utilizing a computer cookie having a dynamic portion updated during subsequent logins and use, according to an embodiment. System environment 300 of FIG. 3 includes an architecture of different interactions from components, databases, applications, and the like used by client device 110, malicious device 120, and/or service provider server 130 discussed in reference to system 100 of FIG. 1. In this regard, client device 110 may request electronic transaction processing or otherwise interact with service provider server 130 that utilizes computer cookies having dynamic values changed during subsequent logins or authentications, where malicious device 120 may attempt to compromise and use the computer cookies.

System environment 300 begins where client device 110 requests authentication and/or login to an account, such as to perform electronic transaction processing, at interaction 1. Client device 110 may access a website, device application, or other interface that provide authentication and account login via data entry to one or more interface fields, such as a username and password. Where client device 110 is performing a first login, a computer cookie associated with previous interactions between service provider server 130 and client device 110 may not be stored to client device 110. As such, a computer cookie, such as cookie identifier 202 from diagram 200 of FIG. 2, may be generated, which includes both a base static identifier for client device 110 and a dynamic value appended to the static identifier. Thus, at interaction 2, service provider server 130 responds with authenticating client device 110 if the authentication information is correct and the authentication appears valid. This causes service provider server 130 to generate the computer cookie through further interactions and/or data negotiation during interactions 2. Once generated, the computer cookie is stored by client device 110 and service provider server 130.

At interaction 3, malicious device 120 may perform some computing attack or other operation to compromise the computer cookie stored to client device 110. When compromised, malicious device 120 may obtain data for the computer cookie so that the computer cookie may be used by malicious device 120 for a fraudulent login. In further embodiments, malicious device 120 may compromise the cookie via other devices or servers, including potentially service provider server 130. For example, instead of hacking or executing a computer attack that compromises the computer cookie directly from client device 110, malicious device 120 may acquire the computer cookie from a third-party device or server. An initial hacker or other malicious party that compromises the computer cookie and illicitly or fraudulently acquires the computer cookie may then act as the third party that sells the computer cookie through a black or underground market, including illicit digital marketplaces. The hacker may also provide the computer cookie to malicious device 120, such as with groups or collectives of hackers and/or malicious users.

If compromised, at interaction 4, malicious device 120 may perform an authentication or login with service provider server 130. This may result in different scenarios depending on if the dynamic value for the compromised computer cookie used by malicious device 120 has been used or not (e.g., if the dynamic value matches the corresponding stored dynamic value with service provider server 130 that is expected for the computer cookie). For example, if client device 110 interacted with service provider server 130 after interaction 3 but before interaction 4, then the dynamic value provided by malicious device 120 will not be expected and will be a stale or expired dynamic value. Conversely, if malicious device 120 is the first to interact with service provider server 130 after interaction 3, then the dynamic value may be expected, but it may then cause an expiration of the dynamic value on client device 110, which would cause suspicious activity when client device 110 attempts valid reauthentication with service provider server 130.

For example, if the dynamic value is old, expired, or previously used and therefore not expected by service provider server 130 based on a stored dynamic value for the computer cookie, service provider server 130 may flag the authentication and/or login attempt, and may request an authentication step-up or further authentication through multifactor authentication (e.g., using a device or additional account for the corresponding user that is trusted, such as a text message to a mobile phone or an email to a trusted email account separate from the account being authenticated). Service provider server 130 may further flag the authentication and/or login attempt, in particular, if step-up authentication is not completed or the information is incorrect. If the dynamic value has been flagged as compromised previously, service provider server 130 may also deploy one or more honeypot traps, such as fake interfaces for login, electronic transaction processing requests, and the like, which may attempt to gain additional information from malicious device 120. This may also include accessing computing logs associated with the login to monitor additional data.

However, if the computer cookie with the dynamic value has not yet been used by client device 110, and thus malicious device 120 proffers a computer cookie having an expected dynamic value, service provider server 130 may change the dynamic value during interaction 4 with malicious device 120. However, client device 110 may not receive the new dynamic value and/or computer cookie in this scenario. Thus, at an interaction 5, client device 110 performs an authentication or login using the expired dynamic value for the computer cookie. Service provider server 130 may then identify the dynamic value as expired and used and may therefore request additional authentication from client device 110. If completed, service provider server 130 identifies the previous authentication and/or login by malicious device 120 was fraudulent or suspicious and may review account activity between the use of the dynamic identifier provided by client device 110 and a last login before client device 110 provided that dynamic identifier. This may correspond to all compromised uses of the account by malicious device.

Further, in some embodiments, client device 110 may use or share a cookie between different browsers, which may cause the computer cookie to not match data expected for a particular browser (e.g., where one browser increased or changes the dynamic value for the cookie, but the other still uses the previous dynamic value that was used in a further authentication). Thus, step up authentication and other increased authentication or security processes may also be required and completed by client device 110 during certain logins. If the account activity is not detected as suspicious, remediation may not be required. If malicious device 120 attempts to use the compromised computer cookie at interaction 6, this computer cookie with the dynamic value may be flagged as potentially compromised. Accordingly, at interaction 6, additional authentication information may be required, and/or the authentication and account usage may be monitored as discussed with respect to interaction 4. Thus, in some embodiments, interactions 5 and 6 may be switched in order depending on which device logs in after a computing cookie is misappropriated by malicious device 120 from client device 110.

Figure 4A:
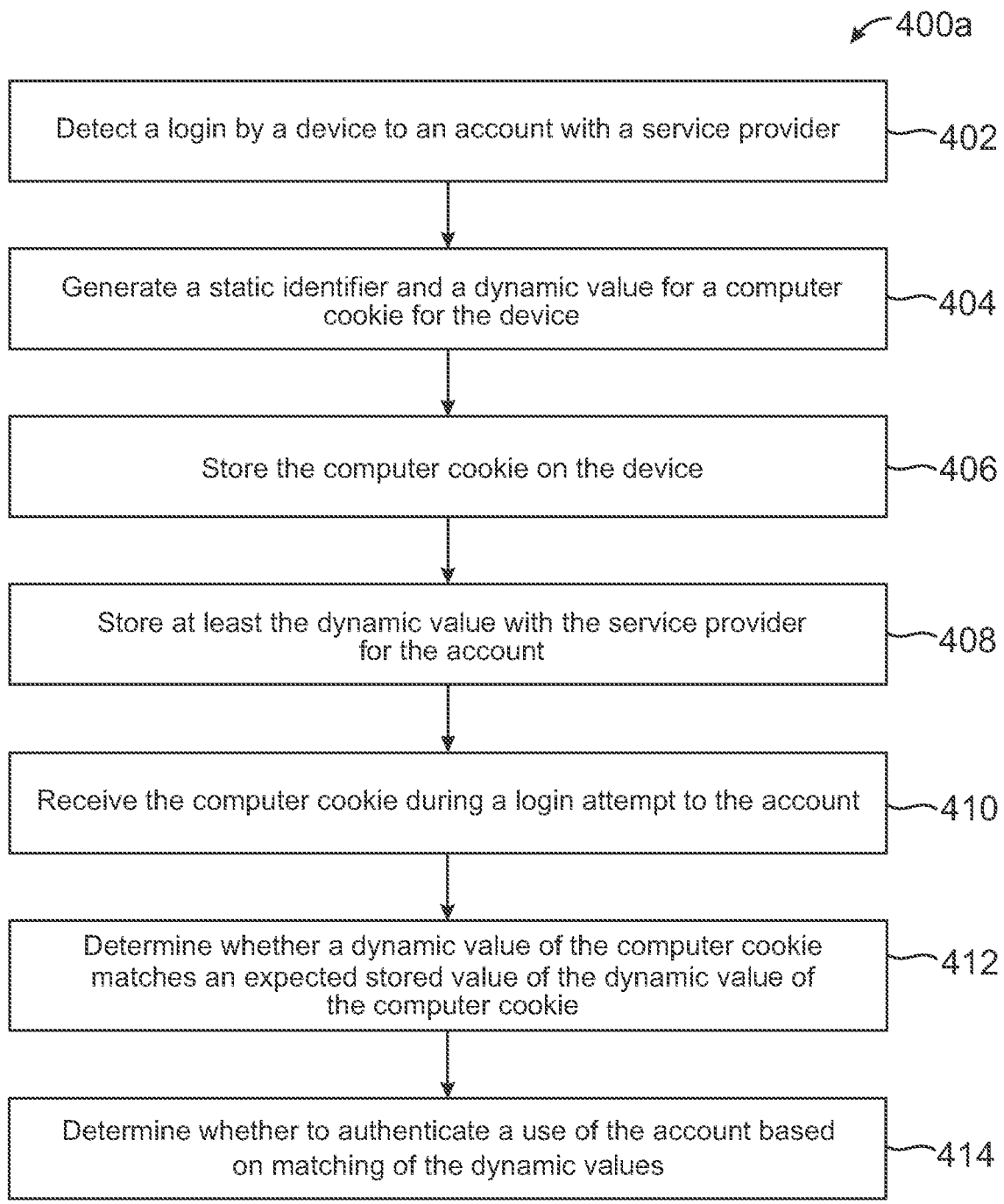
FIG. 4A is a flowchart of an exemplary process for a dynamic value appended to cookie data for fraud detection and step-up authentication, according to an embodiment.

FIG. 4A is a flowchart 400a of an exemplary process for a dynamic value appended to cookie data for fraud detection and step-up authentication, according to an embodiment. Note that one or more steps, processes, and methods described herein of flowchart 400a may be omitted, performed in a different sequence, or combined as desired or appropriate.

At step 402 of flowchart 400a, a login by a device to an account with a service provider is detected. The login may correspond to entry of authentication information and/or other authentication that a device and/or user is authorized to use the account. In some embodiments, this may be a first login or may be a subsequent login where a computer cookie having at least a static identifier is provided. If this is a first login, at step 404, a static identifier and a dynamic value for a computer cookie is generated for the device. However, with subsequent logins, the static identifier may remain the same while the dynamic value may be generated, updated, and/or incrementally increased based on the corresponding dynamic cookie value schema. The computer cookie may be entirely generated by the device or the service provider, or may be generated together based on shared or negotiated values. The static identifier may also always remain the same, or may be updated after a set amount of time, uses, or when the computer cookie is detected as compromised or misused. Further, if only a static identifier is provided, such as with static identifiers that are generated before dynamic values are implemented with the authentication system, then a dynamic element or value will be added to the static identifier.

In contrast, the dynamic value may correspond to a dynamic device identifier (DDI) or other portion/value for the computer cookie that is updated at each use and changed during each subsequent login where the computer cookie is used, although in some embodiments, the DDI or other portion/value is updated less frequently, e.g., every other use or attempted use. For example, a value may be a number or set of alphanumeric characters that increase by one or another set amount during each use. The dynamic value may also be randomized, hashed, or otherwise obfuscated for each use. Once generated and combined, at step 406 the computer cookie is stored on the device, this includes storing the entire computer cookie so it can be provided during a subsequent login. In various embodiments, the computer cookie may be stored and/or updated across all devices and/or web browser applications of the user. For example, the user may link and/or utilize multiple different devices (e.g., a personal computer, tablet computer, wearable computing device, etc.) and/or different web browser applications to access the account. Thus, the service provider may push and/or update the computer cookie and dynamic value across multiple different devices when a dynamic value is generated and/or updated for the computer cookie. At step 408, at least the dynamic value is stored by the service provider for the account in a database of the service provider in association with account information, device information, a device identifier or fingerprint of the user, or other identifying information of the user, the user's device, and/or the browser/application. If the static identifier is already stored by the service provider, only the dynamic value requires updating. Further, the dynamic value may be hashed and/or stored with account information, which may not require the storage of the static identifier where the static identifier may directly identify the account (e.g., as an account identifier or credential).

At step 410, the computer cookie is received during a login attempt to the account. The received computer cookie may be received with or in place of authentication information (e.g., a username and/or password), and may be requested for use with passwordless authentication, reduced authentication requirements, and/or increased trust (e.g., for more sensitive computing operations). Thus, at step 412, it is determined whether a dynamic value of the received computer cookie matches an expected value of the dynamic value of the computer cookie stored by the service provider system. The dynamic value stored by the service provider's system corresponds to a last dynamic value generated and appended to the computer cookie with the static identifier. However, with different devices and/or device applications (e.g., different web browser, mobile application, etc.), different cookies may be shared and/or maliciously compromised. Thus, to determine if a computer cookie matches the one last used for the account, the dynamic values, one from the received computer cookie and the other from the stored dynamic value in a database of the service provider, may be compared. This may provide an additional layer of trust and security.

When performing the matching of the dynamic value to the expected stored value, the service provider may utilize the device's information, such as an identifier or fingerprint, to retrieve the expected stored value for the dynamic value of the computer cookie. Other information may also be utilized in order to receive the expected stored value, such as an authentication credential or other account identifying information that may allow for retrieval of the expected stored value for the particular account. The service provider may then compare the dynamic value, in the computer cookie received from the device requesting the login, to the expected stored value stored with the service provider. Based on this comparison, at step 414, it is determined whether to authenticate a use of the account based on whether the dynamic values match. In various embodiments, that may include approving the login, such as without a further password entry (e.g., passwordless authentication in the case of high trust scenarios), authenticating the login but requiring a step-up authentication, denying authentication, and/or requiring security measures to be implemented that may remediate any potential damage. These embodiments are explained in further detail below.

Figure 4B:
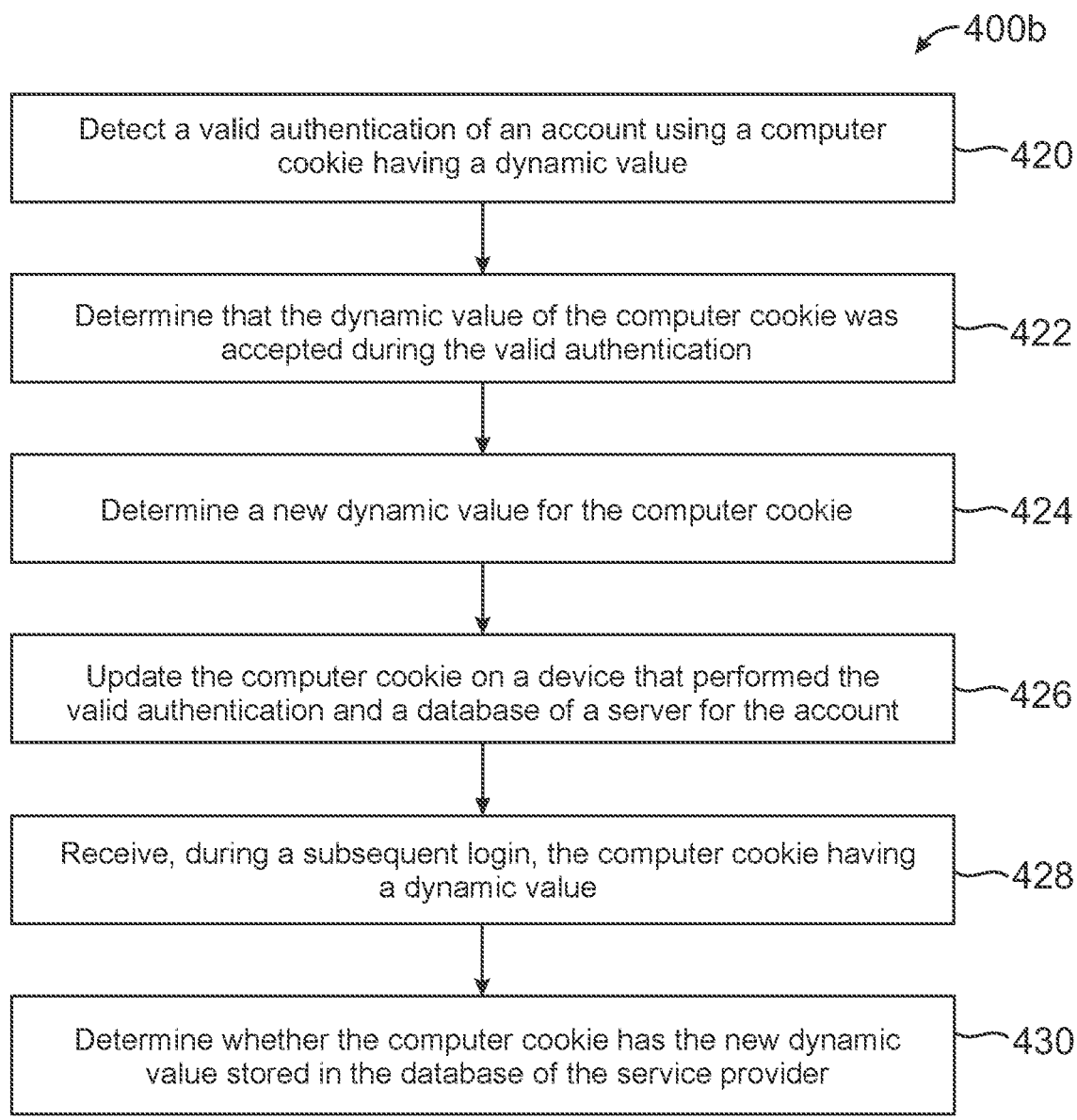
FIG. 4B is a flowchart of an exemplary process for a dynamic value appended to cookie data for fraud detection and step-up authentication, according to an embodiment.

FIG. 4B is a flowchart 400b of an exemplary process for a dynamic value appended to cookie data for fraud detection and step-up authentication, according to an embodiment. Note that one or more steps, processes, and methods described herein of flowchart 400b may be omitted, performed in a different sequence, or combined as desired or appropriate.

At step 420 of flowchart 400b, a valid authentication of an account using a computer cookie having a dynamic value is detected. The valid authentication may occur where the computer cookie is used to login to an account and the computer cookie has a dynamic value that is verified by the corresponding service provider processing the login. In other words, the service provider compares the dynamic value with a stored cookie value, and at step 422, it is determined that the dynamic value of the computer cookie was accepted during the valid authentication. Thus, the computer cookie with the dynamic value was properly used for authentication and the device performing the valid authentication can be trusted. This may initiate a process by the service provider to update the dynamic value for the computer cookie for use with a subsequent login to detect if the computer cookie was compromised.

At step 424, a new dynamic value for the computer cookie is determined. The new dynamic value may correspond to a change in the dynamic value, which may be randomized, determined using a tokenization or other mapping process, and/or incrementally increased in accordance with a schema. The new dynamic value may be generated so that it cannot be guessed by a fraudster or malicious party. However, without knowledge of a number of logins between uses of the computer cookie, utilizing a +1 schema (e.g., incrementally increasing the dynamic value by 1) or the like may be sufficient to prevent fraudsters from guessing the dynamic value when a computer cookie is compromised.

At step 426, the computer cookie is updated on a device that performed the valid authentication and in a database of a service provider for the account. In certain embodiments, the service provider performing the valid authentication may generate a new dynamic value or update the dynamic value to a new identifier, such as a new alphanumeric identifier, hash value, encrypted value, or other like. In such embodiments, the service provider may then store, locally to a database accessible and/or trusted by the service provider, the new dynamic value. The service provider may then further update the computer cookie with the new dynamic value and cause that computer cookie having the new dynamic value to be stored to the device that performed the valid authentication. In other embodiments, the service provider may transmit a message including the new dynamic value to the device that performed the valid authentication that may cause the computer cookie to be updated to include the new dynamic value, with the updated computer cookie further being stored on storage associated with the device. In additional embodiments, the device performing the valid authentication may generate the dynamic value and/or negotiate the new dynamic value with the service provider, which may then cause the local storage of the computer cookie having the new dynamic value to the service provider and the device for subsequent logins.

At step 428, during a subsequent login, the computer cookie having a dynamic value is received. This may occur from the same or different device, and thus, the computer cookie may be analyzed to determine if the dynamic value matches the expected value of the new dynamic value stored in the database of the service provider. Thus, at step 430, it is determined whether the dynamic value of the computer cookie matches the new dynamic value stored in the database of the service provider. In various embodiments, during step 430, it is determined whether to authenticate the subsequent login, flag the login, and/or update the dynamic value of the computer cookie. In a first embodiment, the dynamic value of the computer cookie matches the expected value in the database of the service provider, which was updated after step 426 above. This may allow for lowered authentication (e.g., passwordless authentication) and/or may not require a step-up authentication.

However, in a second embodiment, the computer cookie may have a dynamic value that is one iteration old, such as the dynamic value that was received during the valid authentication at step 420 but is not the new dynamic value stored by the service provider. The service provider may detect that this is one iteration old using a record or log of dynamic values for the computer cookie, and therefore, upon determination that not only does the dynamic value of the computer cookie not match the dynamic value stored in the service provider database, but also that the dynamic value is a recently used dynamic value, the service provider may require a step-up authentication. Therefore, the login attempt is possibly not fraudulent where a user uses different devices and/or browsers. For example, the user that is the holder or owner of the account may be attempting to perform a non-fraudulent login but may be utilizing a different device, browser application, and/or resident device application. This may cause a flag of the login to appear fraudulent due to the dynamic values not matching. However, those values may be close enough in number, age, and/or time that the values may not cause excess scrutiny as the difference may simply be attributed to a change in the login mechanism or channel.

However, in a third exemplary embodiment, the dynamic value may exceed a threshold number, age, and/or time that causes increased scrutiny for the risk rules and/or engines analyzing the authentication and/or login attempt. For example, the dynamic value may be ten or more iterations old (e.g., over a number or time risk threshold that indicates likely fraud and a compromised computer cookie). In such an embodiment, the service provider may lock the account, restrict all transactions or other actions taken using the account, hide personal or financial information, alert the user on a trusted device, and/or take another action due to the likelihood of a fraudster attempting to use the cookie.

At step 414, it is determined whether to authenticate a use of the account based on matching of the dynamic values. If the dynamic values do not match, authentication may be refused, and/or step-up authentication may be required. Further, if the dynamic value from the received cookie is flagged, the device requesting the login may be monitored and/or honeypot pages may be deployed. However, if matched, authentication may be provided, and the login permitted. This login may still be fraudulent though, and therefore, a log of used dynamic values may be maintained. This may include when dynamic values were used and the corresponding device, IP address, and the like, as well as a log of at least a set number or timeframe of used dynamic values. Thus, if the valid device later attempts authentication but uses an expired dynamic value for the device's stored cookie, malicious or fraudulent actions taken with the account may be tracked.

Figure 5:
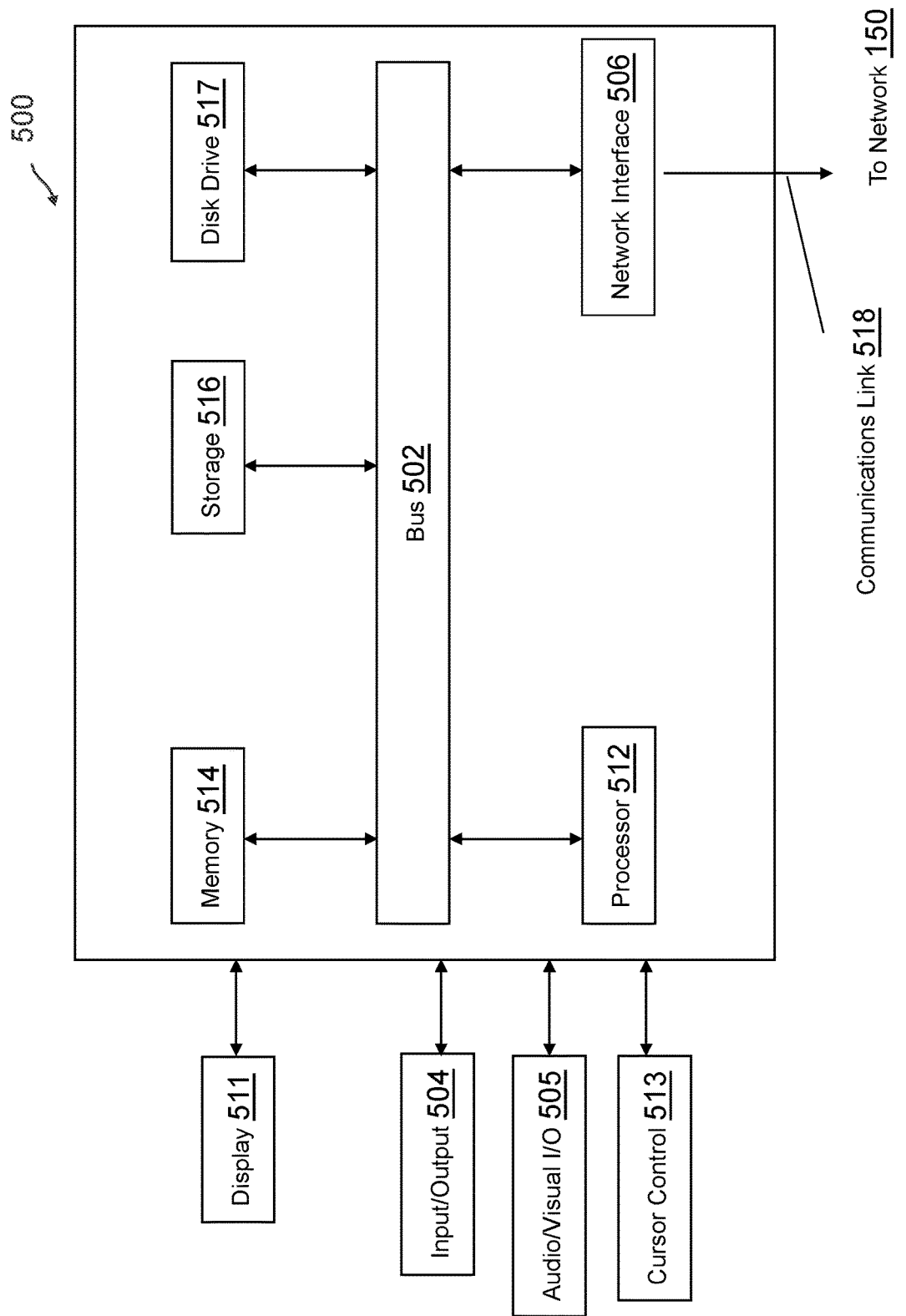
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
      receiving, over a network, a first computer cookie from a computing device during a login to a digital account of a user with the service provider system;
      determining the first computer cookie comprises a first dynamic value and a static identifier;
      accessing a plurality of dynamic values previously generated and used with the static identifier that are stored in association with the first computer cookie;
      determining whether the first dynamic value matches a second dynamic value of the plurality of dynamic values;
      determining a number of logins that occurred between a last update of the static identifier to have the second dynamic value generated for the first computer cookie and the login to the digital account using the first computer cookie;
      determining whether to authenticate the login based on the determining whether the first dynamic value matches the second dynamic value and the number of logins between the last update and the login; and
      in response authenticating the login, flagging the second dynamic value as invalid for a subsequent login, wherein the flagging causes a step-up authentication to be requested when the second dynamic value is received with the subsequent login, and wherein the step-up authentication comprises a multifactor authentication process that requests a verification of the user via one of a text message, an email, or an account credential.

2. The service provider system of claim 1, wherein prior to receiving the first computer cookie with the first dynamic value, the operations further comprise:
generating the first dynamic value;
combining the first dynamic value and the static identifier; and
storing the first computer cookie accessible to the computing device or another computing device configured to perform an authorized login to the digital account.

3. The service provider system of claim 2, wherein prior to the generating the first dynamic value, the operations further comprise:
detecting the authorized login with the service provider system to the digital account via one of the computing device or the another computing device,
wherein the first dynamic value is determined in response to the detecting the authorized login.

4. The service provider system of claim 1, wherein the determining whether the first dynamic value matches the second dynamic value associated with the first computer cookie comprises matching both the first dynamic value and the static identifier in the first computer cookie to the second dynamic value and the static identifier in a database accessible by the service provider system.

5. The service provider system of claim 1, wherein the first dynamic value and the second dynamic value comprise at least one of alphanumeric characters, plain text, or cryptographic text, wherein the first dynamic value and the second dynamic value comprise at least one of sequentially generated data, randomized data, or timestamped data, and wherein the first dynamic value and the second dynamic value are generated using one of a sequence running number, a function on the timestamped data, a randomization or a combination thereof.

6. The service provider system of claim 5, wherein the timestamped data comprises a timestamp having at least a millisecond value for a time of a generation of the first dynamic value and the second dynamic value.

7. The service provider system of claim 1, wherein the operations further comprise:
in response to determining to authenticate the login based on determining that the first dynamic value matches the second dynamic value, causing the first dynamic value to be updated for the first computer cookie; and
updating the second dynamic value stored in association with the first computer cookie, wherein the updated first dynamic value is the same as the updated second dynamic value.

8. The service provider system of claim 7, wherein the updating comprises:
generating a new value for the first dynamic value and the second dynamic value, wherein the new value is the same for the first dynamic value and the second dynamic value;
generating a second computer cookie by appending the new value to the static identifier for the first computer cookie;
storing the second computer cookie by the service provider system; and
causing the second computer cookie to be stored by the computing device.

9. The service provider system of claim 1, wherein the first dynamic value does not match the second dynamic value, and wherein the login is not authenticated on the computing device based on the first dynamic value not matching the second dynamic value, the operations further comprise:
flagging the login to the digital account by the computing device; and
running a risk analysis of the login to the digital account by the computing device.

10. The service provider system of claim 9, wherein the operations further comprise:
requesting the step-up authentication for the login to the digital account from the computing device;
receiving a response to the step-up authentication for the login to the digital account;
determining that the response authenticates the login to the digital account; and
flagging, for review, account uses of the digital account between the login to the digital account by the computing device and a previous use of the digital account that caused a generation of the first computer cookie having the first dynamic value.

11. A method comprising:
receiving, during an authentication attempt for access to an account by a device, a persistent computer cookie generated from a last authentication to the account with a service provider, wherein the persistent computer cookie comprises a dynamic value with a static identifier issued based on the authentication attempt;
accessing a plurality of dynamic values previously generated and used with the static identifier that are stored in association with the persistent computer cookie;
determining that the dynamic value does not match an expected dynamic value for the dynamic value of the plurality of dynamic values for the persistent computer cookie;
determining a number of logins that occurred between a last update of the static identifier to have the dynamic value generated for the persistent computer cookie and the authentication attempt;
flagging at least one of the authentication attempt, the last authentication, or one or more recent authentications as potentially fraudulent based on determining that the dynamic value does not match the expected dynamic value for the dynamic value and the number of logins, wherein the flagging identifies a set of dynamic values stored by the service provider for the static identifier a potentially fraudulent, and wherein the flagging invalidates the dynamic value for a subsequent login; and
causing, based on the flagging, a step-up authentication to be requested when the dynamic value is received with the subsequent login, wherein the step-up authentication comprises a multifactor authentication process that requests a verification of the user via one of a text message, an email, or an account credential.

12. The method of claim 11, further comprising:
requesting the step-up authentication for the authentication attempt based on flagging the authentication attempt as potentially fraudulent.

13. The method of claim 12, further comprising:
receiving a response to the step-up authentication;
determining that the response does not authenticate the authentication attempt;
preventing the authentication on the device; and
alerting at least one of a user for the account or an account security administrator for the account that the authentication attempt is potentially fraudulent.

14. The method of claim 13, further comprising
receiving, from one of the device or another device, a successful authentication attempt for access to the account subsequent to the alerting; and
issuing, to one of the device or the other device, a new persistent computer cookie having a new static identifier and a new dynamic value.

15. The method of claim 14, further comprising:
flagging the persistent computer cookie used during the authentication attempt as compromised.

16. The method of claim 12, further comprising:
receiving a response to the step-up authentication;
determining that the response authenticates the authentication attempt;
generating an additional dynamic value for a new persistent computer cookie for the device; and
issuing, to the device, the new persistent computer cookie having at least the additional dynamic value.

17. The method of claim 12, further comprising:
deleting the persistent computer cookie;
initiating a re-securing process for the account, wherein the re-securing process comprises at least one of a change password process or an account review process; and
accepting a user claim for unauthorized activity with the account.

18. A non-transitory machine-readable medium having stored thereon machine-readable instructions executable to cause a machine to perform operations comprising:
detecting, via a device, a successful authentication during a login to an account with a service provider, wherein the successful authentication includes a step-up authentication comprising a multifactor authentication process that requests a verification of the user via one of a text message, an email, or an account credential;
generating, based on the successful authentication, a static identifier for a first computer cookie that is to be stored on the device;
generating a dynamic value for the first computer cookie using a dynamic value operation;
creating a combined identifier by combining the static identifier with the dynamic value for the first computer cookie, wherein the combined identifier for the first computer cookie provides a confidence factor for a subsequent login to the account with the service provider;
updating a plurality of dynamic values to include the dynamic value, wherein the plurality of dynamic values were previously generated and used with the static identifier that are stored in association with the first computer cookie;
determining a number of logins that occurred between a last update of the static identifier to have a previous one of the plurality of dynamic values generated for the first computer cookie and the successful authentication for the login to the account;
updating the plurality of dynamic values based on the number of logins;
storing, by the service provider, the first computer cookie with the combined identifier; and
causing the first computer cookie with the combined identifier to be stored on the device.

19. The non-transitory machine-readable medium of claim 18, wherein the operations further comprise:
receiving a second computer cookie during the subsequent login to the account with the service provider;
determining whether the second computer cookie matches the first computer cookie stored by the service provider; and
determining whether the subsequent login to the account indicates a risk of a fraudulent login based on determining whether the second computer cookie matches the first computer cookie.

20. The non-transitory machine-readable medium of claim 18, wherein the step-up authentication is requested from the device during the successful authentication in response to determining that the device is a new device attempting the login of the account.

* * * * *